United States Patent Office 3,227,510
Patented Jan. 4, 1966

3,227,510
DYEING SUBSTRATES IONICALLY BINDING IN LOCALIZED AREAS CATALYSTS FOR THE PRE-DYEING OLEFIN POLYMERIZATION THEREON
Douglas J. Bridgeford, Danville, Ill., assignor to Tee-Pak, Inc., Chicago, Ill., a corporation of Illinois
No Drawing. Filed Nov. 25, 1964, Ser. No. 413,997
The portion of the term of the patent subsequent to Mar. 26, 1980, has been disclaimed
6 Claims. (Cl. 8—14)

This invention relates to a novel process for dyeing a polymeric material in the form of fibers, films, webs or fabrics by depositing a polymer in selected portions of the host material and contacting the polymer deposited material with a dye for the guest polymer.

This invention is a continuation-in-part of my copending application Serial No. 718,995, filed March 4, 1958, for Method of Depositing a Polymer of Olefinically Unsaturated Monomer Within a Polymeric Material and the Resulting Product, now U.S. Patent No 3,083,118, issued March 26, 1963.

In my copending patent application there is described in considerable detail a process of polymer deposition. In that process, a polymeric host material having at least gelatinous solidity and having appreciable ion exchange capacity is contacted with a material adapted to form at least part of a catalyst for effecting polymerization of an olefinically unsaturated monomer. The catalyst material is fixed within the polymeric host material by ion exchange reaction. The composite product of the polymeric host material and catalyst is contacted with an olefinically unsaturated monomer and anything additional required to render the chemically fixed material catalytically active to polymerize the monomer and deposit the resulting guest polymer within the polymeric host material.

In the dyeing of films, fibers, webs, fabrics, etc., in accordance with this embodiment of the invention, a polymer is deposited within the host material and the resulting composite product treated with a dye for the guest polymer. The catalyst is applied to the host material in preselected patterns or designs comprising a preselected area less than the entire area of the treated material. The treated material with a catalyst pattern imprinted thereon is then treated with a monomer and anything else required to render the catalyst active. This treatment effects a polymerization of the monomer at preselected areas of the host material corresponding to the pattern of catalysts on the most material. The monomer is polymerized and deposited within the host material at localized areas where the catalyst was applied. The composite material consisting of the host material and deposited polymer is then treated with a dye for the guest polymer. The dye which is thus applied is localized in accordance with the pattern of deposition of the guest polymer which in turn corresponds to the pattern of application of the catalyst. The dyes may be complexed with the deposited polymer or may be chemically or physically anchored thereto. If desired, more than one dye can be used to produce decorative effects. Also, the catalyst, e.g., a silver compound, can be uniformly applied and localized in a preselected pattern by photochemical reaction. Thus, a photographic image can be impressed on the host material and the polymer deposited only in the pattern of the image. The subsequent dyeing of the deposited polymer "develops" the image.

In carrying out this process the catalyst is deposited in the host material by ion exchange reaction as described in my copending Patent No. 3,083,118. The various types of host materials, catalysts, monomers, and reaction conditions utilized in said patent can be used in carrying out the process of this invention.

This process includes a step in which controlled placement of part or all of a polymerization catalyst system in a predetermined or preselected region within and/or upon the material to be treated is effected primarily if not solely through ion exchange, and other steps in which the material is impregnated with an olefinic monomer and any remaining components of the catalyst system to bring about formation and deposition of a polymer of the monomer throughout the predetermined region in which the catalyst is present.

To achieve the controlled placement just mentioned, an ionic material adapted to provide at least a part of a polymerization catalyst is chemically fixed in a host polymeric starting material, by ion exchange with ion exchange groups located in a preselected region of the starting material, to form a salt compound. The salt compound thus formed is treated in any order, with the olefinically unsaturated monomer to be polymerized and with anything additional required to render said chemically fixed material catalytically active. As a result, the guest monomer is polymerized and deposited only in the preselected region of the host material.

The present method is applicable to the treatment of any polymeric materials, whether natural or synthetic, which possess a naturally occurring ion exchange capacity. The process is likewise applicable to the treatment of polymeric materials which have been modified by the artificial introduction of ion exchange capacity into the material or onto the surface thereof by chemical reactions which are well known in the art. Alternatively, chemical substances capable of binding ions may be impregnated into the polymeric materials to be treated, or introduced into the raw materials from which the articles to be treated are formed.

Reactions by which ion exchange capacity may be artificially introduced include, for example: oxidation, sulfonation, amination, esterification, etherification, and a number of like processes well known in the art.

In this method the polymeric material which is to be treated is contacted with a catalyst, or part of a catalyst system, for effecting polymerization of the monomer or monomers to be deposited within the material, which catalyst or part of a system is also capable of forming a salt compound through ion exchange with chemical groups of the material to be treated.

The ion exchange involved may be either cationic exchange with the hydrogen or cation associated with chemical groups of the material being treated, or anionic exchange with anions of chemical groups of the material used. In some cases, both cationic and anionic exchange may be present at the same time.

The ion exchange step is carried out with the catalyst concentration, pH, and other reaction conditions such as to produce ion exchange between the catalyst and the polymeric starting material. As a result, the catalyst is held by salt formation with chemical groups of the starting material within a region in the interior and/or upon the exterior of the material that may be called a "deposition region." In other words, a salt compound which is the chemical reaction product of the host polymeric starting material and the ion constituting a part of the polymerization catalyst system is formed throughout that region.

The term "deposition region" is used to describe the region in which the polymerization catalyst is chemically bonded in the manner just described to the material being treated, because in the remaining steps of the method of this invention a polymer is formed and *deposited* in the same region. In this specification and claims, the material being treated by the method of the invention is sometimes referred to as the "polymeric starting material," "polymeric host material," "host polymer," or similar terms while the polymer which is added to the starting material is sometimes referred to as the "guest polymer."

The conditions of pH, cation or anion source concentration, and the like, at which ion exchange will proceed between ion exchange groups in the polymeric starting material and ions in the polymerization catalyst vary greatly with the particular starting or host material and the particular ion source employed. The general conditions for producing ion exchange are well known in the art; the particular conditions required for particular reagents can be developed from available knowledge by any person skilled in the art. Among other sources, one determining the necessary conditions for ion exchange in a particular situation may consult the principles set forth at page 25 of Ion Exchange Resins, Kunin and Meyers, Wiley, New York, 1951.

The "deposition region" in a given polymeric starting material may be, for example, the entire interior of the individual articles—such as individual fibers, films, filaments, sheets, webs, chips, granules, particles, or the like—being treated with the method of this invention. However, if desired, it may be restricted to only that portion of the article, including the surface thereof and extending inwardly from the surface substantially a uniform distance, which in effect forms a sheath about the article. Or, if it is preferred, the deposition region may be localized at the core of each of the articles being treated, such as, for example, individual fibers.

There are at least two methods by which the polymerization catalyst may be chemically bonded to the ion exchange groups of the material being treated in a sheath-like deposition region restricted to the outer portions of the article. First, ion exchange groups may be introduced to only the outer portions of the interior of the article. The topochemical reaction between fibrous cellulose and sodium chloroacetate is an example. Second, if ion exchange groups are initially present throughout the interior of the material to be treated, ultimate bonding of the catalyst to the starting material by formation of a salt compound may be limited to only the outer portion of the interior. An example of this method would be to contact cellulose derived from wood (which contains carboxyl groups) with a solution of almost neutral ferrous iron for a very short time so that only the carboxyl groups in the outer portions of the interior of the cellulose are converted by ion exchange to the iron salt.

In order to restrict the deposition region to the center or core only of the article being treated, the article may be treated so as to exchange all the ion exchange groups in the interior of the article, with the thus treated article thereafter being passed through an oxidizing or reducing agent for a period of time that is sufficiently short that only the catalyst in the outer portions of the article is destroyed. In this way, catalyst placement is restricted to a deposition region that occupies only the center of the article being treated, and polymer formation and deposition will be similarly restricted in the other steps of the method of the invention.

No matter whether the deposition region formed by controlled placement of the polymerization catalyst extends throughout the entire interior of the article being treated, or constitutes only a central core, the distribution of the *catalyst* throughout the region involved corresponds substantially to the distribution within the deposition region of the *ion exchange groups by means of which the catalyst is bound* to the polymeric starting material is further in accordance with the pattern in which the catalyst is applied to the host material.

Now, in any given case a particular catalyst will be bound to the chemical groups of the polymeric starting or host material by exchange of ions having a particular sign, i.e., either plus or minus. Hence the distribution of catalyst within the deposition region will be substantially similar to the distribution within the region of *ion exchange groups of a given sign* contained in the host, but corresponding to the pattern in which the catalyst was applied.

When a suitable olefinic monomer is contacted with the polymeric host material containing polymerization catalyst distributed within the deposition region as just described, and the other necessary conditions for polymerization are present, a guest polymer will be *formed* and *deposited* in the vicinity of the ion exchange groups of the host to which the catalyst is bound.

The reason for this is that the decomposition of the catalyst or the reaction of the catalyst produces very reactive species in the near neighborhood of the bound ionic species. These reactive species may be excited states of ions or molecules, or free radicals. Whatever they are, they are usually so reactive that they cannot diffuse an appreciable distance (relative to molecular dimensions) before they react further in any of a number of ways, some of which are:

(a) Reaction with atoms or atom groupings of the host material.
(b) Reaction with the solvent in the host.
(c) Reaction with substances dissolved in the imbibed liquid in the host.
(d) Reaction with other active species.
(e) Unimolecular transformation to more stable species.
(f) Reaction with a monomer molecule to convert it to a free radical or other species that can propagate the growth of a polymer by monomer molecule addition.

In most common olefinic polymerization processes the growth of the polymer molecule is complete in a small fraction of a second or the growing polymer is so large that its diffusion rate is very slow. Thus the polymer is necessarily placed in the near locus of the bound catalyst. In addition, physical entanglement of the guest molecule among the host molecules as well as intermolecular attraction further retards or prevents change in position of the guest molecule.

It follows from this that the concentration of the deposited *polymer* in the materials resulting from use of this invention is greatest in the vicinity of the *ion exchange groups to which the polymerization catalyst is bound* in the catalyst placement step of the invention. Likewise, the distribution of the deposited polymer within the deposition region is substantially the same as the distribution within the region of *ion exchange groups of a given sign* contained in the host.

In many instances the ion exchange groups of the host polymer are distributed uniformly throughout any deposition region in which they are found. Thus in these instances the ultimate polymer deposition will extend uniformly throughout the deposition region within the polymeric article that has been treated. Staining with various reagents, such as iodine, that will selectively stain the deposited polymer with a dark color and the unmodified polymeric starting material with a light color if at all, gives experimental evidence that in any such instance the deposited polymer in the final material resulting from use of this invention is distributed uniformly throughout the deposition region. Where the polymer has been applied in a preselected pattern according to a pattern of catalyst impressed upon the host material, the application of a specific dye for the deposited polymer will produce a colored pattern corresponding to the pattern of polymer deposition.

The polymerization catalyst employed in this method may be a single compound which by itself is capable both of ion exchange bonding with the material being treated and of initiating polymerization of the monomer or monomers to be polymerized and deposited in the starting material. Or it may be a multiple component catalyst system, such as a so-called "redox couple," one part of which is incapable by itself of initiating polymerization. In such case one component of the catalyst system may if desired be introduced into the starting material separately through an ion exchange reaction which chemically binds it to the individual articles being treated, with the remainder of the system being introduced into the material thereafter to complete the catalyst.

The remaining steps of the method of this invention are to contact the material being treated with a monomer or monomers, preferably in solution, and to continue such contact to form and deposit a polymer or copolymer of the monomer throughout the deposition region defined by the controlled catalyst placement step of the method.

In the case of a multiple component catalyst system, the preferred order of steps is to (1) introduce the first component of the catalyst into the polymeric starting material by ion exchange, (2) then contact the material with the monomer, and (3) thereafter contact the material with the remaining component or components of the catalyst system.

However, if desired, the order of these steps may be varied. For example, the starting material may be first contacted with the monomer and then successively with the two components of the catalyst system. The two components of the catalyst may be applied in succession, followed within a short time by the monomer. If desired, the monomer and one component of the catalyst system may be applied simultaneously, followed by the remainder of the catalyst system. Alternatively, either of the components of the catalyst system may be applied first, followed by simultaneous application of the monomer and the remainder of the catalyst system. If the polymerization catalyst system is a so-called "redox couple," the reducing and oxidizing agents may be applied, in the steps just listed, with either one of the two agents introduced first.

Ion exchange with the host polymeric starting material containing ion exchange groups can take place in the same solution that contains the monomer, and the catalyst which is thus bound may subsequently initiate polymer deposition at a low temperature, or the temperature may be raised to start decomposition of the catalyst and to deposit the guest polymer in the host material. Preferably, however, as indicated above the monomer solution containing one ionic member of the catalyst system is used to steep the host material containing ion exchange groups into which the guest polymer is to be deposited, and the other member of the catalyst system is added thereafter.

The speed of polymer formation with the bound catalyst has been found to be higher in some cases, and lower in others, than would be the case with a homogeneous polymerization using the same catalyst species and the same catalyst concentration. Thus the *bound* catalyst, in place within and/or upon the host polymer, is acting as a new catalyst system.

In these cases, the chemically bound catalyst in place within the host polymer is acting in effect as a heterogeneous catalyst. The limitation in space available for polymer growth or the configuration of the force field around the growing guest molecule may impose limitations on direction and nature of polymer growth and even the steric (L or D) configuration of the guest. Depending upon the circumstances this face may either increase or decrease the rate of formation and deposition of polymer.

The classes of monomers that may be used with the method of this invention include olefinic monomers such as vinyl, vinylidene, allyl and diene monomers.

Some of the specific monomers that may be employed with the method of this invention include methyl methacrylate, ethyl methacrylate, butyl methacrylate, methyl acrylate, ethyl acrylate, butyl acrylate, octyl acrylate, vinyl acetate, vinylidene chloride, styrene, acrylonitrile, 4-vinyl pyridine, acrylamide, N-vinyl pyrrolidone, acrylic acid, methacrylic acid, itaconic acid, allyl methacrylate, allyl acrylate, methallylacrylate, vinyl methacrylate, p-chloro- styrene, bis-B-chloroethyl vinyl phosphonate, 4-vinylcyclohexene, vinyl methacrylate, calcium acrylate, crotonic acid, B-aminoethylacrylate, disodium fumarate, methacrylamide, 2-N-morpholinoethyl acrylate, acrolein, styrene sulfonic acid, 2,5-dichlorostyrene, N,N-dimethylaminoethyl acrylate acetate, N,N-dimethylaminoethylacrylate base, pentachlorophenoxyacrylate, methylene bisacrylamide, 2-vinyl pyridine, N-vinyl carbozole, allyl methacrylate, 2-ethylhexyl acrylate, vinyl chloride, vinyl stearate, butadiene, chloroprene, maleic anhydride, methyl 2-chloroacrylate, methylstyrene, diethyl maleate, methacrylonitrile, tetra fluoroethylene, divinylbenzene, and many others.

Mixtures of such monomers may also be employed, in many such cases resulting in formation and deposition of copolymers. If desired, the polymeric starting material may be treated first with one of these monomers and then with another.

While water is the cheapest solvent or dispersion medium for the ion exchange and the polymer deposition steps of this method, other solvents and mixtures of solvents such as alcohols, dioxan, acetone and the like may be used. As a matter of fact, if desired the solvent may be omitted altogether and the polymerization reaction carried out by use of pure monomer.

The deposition may be carried out under air, nitrogen, an inert gas, a volatile monomer itself, or under steam from the refluxing solution as the blanket. The deposition may be carried out at room temperature or elevated temperature, and at atmospheric pressure or above.

The various reagents employed in the method of this invention, such as the polymerization catalyst or the monomer to be polymerized, may be introduced into the host or starting material by spraying, printing, doctoring, rolling, dipping or other methods in addition to steeping. Dusting of a water soluble salt catalyst on a wet surface may also be employed.

The following nonlimiting examples are illustrative of the scope and application of this invention. However, it should be noted that the invention may be carried out using any of the reactants or reaction conditions within the scope of my copending U.S. Patent No. 3,083,118.

*Example 1*

This example gives an illustration of the chemical modification of the guest polymer after it has been deposited in the host or starting material. It also discloses proof of controlled localization to one side of a cellulose film of a polymer corresponding to the locus of the bound catalyst.

A four foot long tube of regenerated cellulose film about four mils thick and three inches in diameter was tied at both ends. The tube was immersed for three seconds in a 0.7% solution of ferrous ammonium sulfate at a pH of 4.5 and 25° C., and then washed in deionized water to remove iron not chemically combined with the cation binding groups of the film. The film was then immersed in two liters of 0.003% hydrogen peroxide containing 25 ml. of pure methyl methacrylate, the solution being at the boiling point under reflux for fifteen minutes. Polymerization was stopped by dumping into cold water. The film was then washed in hot water for several hours to remove excess monomer.

Pieces of the film were cut out and the side of the film exposed to the ferrous catalyst solution was marked for identification. Several of the films were dehydrated in acetone and in alcohol. The methyl methacrylate polymer within the film was then converted to the acid hydrazide derivative by refluxing the film for seventeen hours with ten times its weight of hydrazine hydrate. The film was then washed for several hours in warm distilled water to remove the excess reagent.

Several pieces of film were placed in a sensitive Tollens reagent contained in an actinic glass vessel, pieces of film removed at intervals, and microscopic slides made of cross sections of the film. The films varied in color with time from a yellow to a deep red-brown. The cross sections showed that silver had been deposited within the film to a depth of only one fourth of the thickness of the film and from the side of the film which had been exposed to the catalyst.

Furthermore, other samples of the same pure cellulose film exposed to the same catalyst solution for three seconds, washed in deionized water to remove excess iron, dropped into 1% sodium sulfide for twenty minutes, dehydrated, and cross sections made, showed the green color of ferrous sulfide precipitation penetrating into the film about the same distance as the band of precipitated colloidal silver metal. The film contained 0.031 meq./gm. exchange capacity.

*Example 2*

In both this example and Example 3, the initial ion which was combined with the cellulose was thereafter converted by a chemical reaction into another species, not necessarily ionic, whose locus was determined by the initial ion exchange reaction and which acted as the catalyst for the polymerization and deposition of the guest polymer.

Cellulose films about 14 mils thick and containing 0.026 meq./gm. exchange capacity were dipped into 0.05 M cupric acetate at 25 degrees for five minutes. The excess uncombined copper was washed out and the films then immersed in an 0.05 M solution of sodium hydrosulfite for two minutes. The film became purple due to colloidal copper. The films were then washed in warm water to remove the excess reagent, and immersed in a solution containing 20 ml. of pure methyl methacrylate and 1 g. of ammonium persulfate in 400 ml. of water. The film was left there at 25° C. for fifteen minutes, during which time the purple color of the film was gradually removed and the film became only slightly translucent.

When the film had been washed and dried, it was found to have increased in weight by 12%.

*Example 3*

The same type film as in Example 2 above was immersed in 0.01 N silver nitrate for five minutes. It was washed free of uncombined silver and immersed in 0.1% hydrazine hydrate in water for five minutes. Metallic silver was precipitated. The film was then washed and dropped into the same monomer system as in Example 2 and left to stand for fifteen minutes.

The film was decolorized in about seven minutes, and the film after washing and drying overnight at 110° C. had gained in weight by 2.2%.

*Examples 4 to 6*

One gram of cellulose film was steeped in 0.7% ferrous ammonium sulfate solution at room temperature and pH 5.5 for one minute and washed with deionized water to remove the salt not chemically combined.

Ten ml. of 50% aqueous solution of the acetate salt of N,N dimethyl aminoethyl acrylate was added to 100 ml. of boiling 0.03% hydrogen peroxide. The treated cellulose film was added and refluxing was continued for fifteen minutes.

After the film was removed, washed with hot water for several hours, and dried overnight at 110° C., it was found to have increased in weight by 6.3%. The film remained flexible, and could be dyed with acid dyes. When this process is applied to cellulosic fibers in the form of paper or threads or fabric, the products which are produced are readily dyed with acid dyes.

When the above procedure was repeated using N,N dimethyl aminoethyl acrylate, instead of the acetate salt, polymer was deposited in the film in the amount of 3.8%.

Then the above procedure was repeated except that the cellulose films were treated only three seconds with the ferrous catalyst solution before being subjected to polymer deposition. The increase in film weight was only 1.4%, but the polymer was localized in the surface layers of the film.

In each case where polymer was deposited having a basic functional group, the resulting product was readily dyed by acid dyes. Acid dyes which can be used in this manner include sulfonic acids or sulfonic acid salts of dye compounds of the nitrophenol, azo, triphenylmethane, anthraquinone, indigoid, and similar series, but primarily azo and anthraquino dyes, e.g., Milling Yellow H 5 G (C. I. 23900), Brilliant Carmine L (C. I. 24830), Supranol Scarlet G (C. I. 23250), Toluylene Brown G (C. I. 35205), Fast Light Yellow G (C. I. 18820), Anthralan Yellow G (C. I. 19020), Acid Magenta (C. I. 42685), Sulfonic acids of phenylated Rosanilines, Rosinduline GG (C. I. 50120), sulfonated Alizarin (C. I. 58000).

*Examples 7 and 8*

Beta amino ethyl acrylate was polymerized into cellulose film by the procedure used in Example 5. The films increased in weight by 18%.

In another experiment, the cellulose film was treated for only five seconds in the ferrous solution and then used for polymer deposition from beta amino ethyl acrylate. Under these conditions, only 2.1% polymer was deposited.

In each of these experiments, the film containing deposited polymer could be fast dyed with acid dyes such as Orange No. 1 free acid (C. I. 14600), acid solutions of Orange 11 (C. I. 15510), F. D. and C. Red No. 3 (C. I. 45430), and common wool dyes. The amino group in the polymer was capable of acid absorption and of ion exchange after conversion to a salt. When the films were dyed, the dye was found to be localized in the region of polymer deposition.

*Examples 9 and 10*

These examples illustrate the use of ion exchange bound catalyst deposition of polymer acids to create cation exchange membranes of medium ion exchange capacity from cellulose film.

Cellulose film was steeped in 0.1% ferrous solution, as ferrous chloride, for one minute and then washed. The film was placed in 200 ml. of 0.003% hydrogen peroxide solution containing 10 ml. of glacial methacrylic acid. The mixture was heated at reflux for fifteen minutes and then dropped into cold water to stop the reaction. The film was dried and weighed and found to have increased in weight by 9.2%.

When this procedure was varied by soaking the film in ferrous solution for only five seconds, the polymer deposited product contained only 1.4% polymer. The polymer deposition was localized in surface layers of the film as shown by dyeing the film with basic dyes and microscopically examining cross sections.

*Example 11*

This example illustrates the controlled polyacrylonitrile deposition into only the outer portions of the fibers of a rayon with large diameter fibers.

Rayon continuous yarn, which contained no treating agents and had an ion exchange capacity of about 0.026 milliequivalent per gram, was pressed flat so that all the filaments were visible and then wound on a rotating drum which was partially immersed in a ferrous ammonium sulfate solution containing 0.1% ferrous ammonium sulfate at pH 5.2. The drum was rotated at such speed that the yarn was exposed to the catalyst solution for about 0.2 second and was washed immediately after removal from the solution.

The treated fiber was dropped into a solution of 5% acrylonitrile in water at the boil. The solution was made 0.03% in hydrogen peroxide and the mixture refluxed for ten minutes.

After the yarn was dried, it was found to have increased in weight by 2%. Its hand did not seem to have been changed appreciably.

The deposition made above was made with a 50:1 solution to yarn ratio.

When the fiber was dyed with an acid dye using the reduced copper technique, it was found that the deposition of the polymer had been limited to the outer third of the "radius" of the fiber.

While I have described this invention with reference to a few preferred embodiments it should be understood that the invention can be carried out using any of the host materials, reactants, catalysts, and reaction conditions described in my copending U.S. Patent No. 3,083,118.

What is claimed is:

1. A method of dyeing a polymeric material in the form of a fiber, film, web, or fabric which comprises chemically fixing in a preselected pattern, less than the entire surface thereof, a material adapted to provide at least a part of a catalyst for effecting polymerization of an olefinically unsaturated monomer, within the polymeric material by ion exchange reaction, treating the polymeric material and chemically fixed material, in any order, with said olefinically unsaturated monomer, and anything additional required to render said chemically fixed material catalytically active, to polymerize said monomer and deposit the resulting guest polymer within said polymeric material in said preselected pattern, and contacting the polymer-modified material with a dye for the guest polymer, whereby said polymeric material is dyed in said preselected material.

2. A method in accordance with claim 1 in which the guest polymer contains functional groups which are chemically receptive to said dye.

3. A method in accordance with claim 1 in which the guest polymer contains acid functional groups and the dye is basic.

4. A method in accordance with claim 1 in which the guest polymer contains basic functional groups and the dye is acidic.

5. A method in accordance with claim 1 in which the catalyst is applied uniformly to the polymeric material and fixed in a preselected pattern by photochemical reaction.

6. A method in accordance with claim 5 in which the catalyst is a silver compound.

References Cited by the Examiner

UNITED STATES PATENTS

| | | | |
|---|---|---|---|
| 2,123,152 | 7/1938 | Rivat | 8—18 |
| 2,367,880 | 1/1945 | Lindh | 260—29.1 |
| 2,369,613 | 2/1945 | Schubert et al. | 8—18 |
| 2,379,236 | 7/1945 | Jenkins | 260—29.1 |
| 3,038,800 | 6/1962 | Luckey. | |
| 3,083,113 | 3/1963 | Bridgeford | 8—128 X |

NORMAN G. TORCHIN, *Primary Examiner.*

D. LEVY, *Assistant Examiner.*